US008780368B2

United States Patent
Cong et al.

(10) Patent No.: US 8,780,368 B2
(45) Date of Patent: Jul. 15, 2014

(54) SCANNING-PRINTING INTEGRATED APPARATUS

(75) Inventors: Qiangzi Cong, Weihai (CN); Tianxin Jiang, Weihai (CN); Mingdong Huang, Weihai (CN); Xiaojie Tang, Weihai (CN); Zhihua Han, Weihai (CN)

(73) Assignee: Shangdong New Beiyang Information Technology Co., Ltd., Weihai (CN)

( * ) Notice: Subject to any disclaimer, the term of this patent is extended or adjusted under 35 U.S.C. 154(b) by 265 days.

(21) Appl. No.: 13/320,393

(22) PCT Filed: May 7, 2010

(86) PCT No.: PCT/CN2010/072510
§ 371 (c)(1),
(2), (4) Date: Jan. 31, 2012

(87) PCT Pub. No.: WO2010/135948
PCT Pub. Date: Dec. 2, 2010

(65) Prior Publication Data
US 2012/0120433 A1  May 17, 2012

(30) Foreign Application Priority Data

May 23, 2009 (CN) .......................... 2009 1 0141896

(51) Int. Cl.
*G06F 3/12* (2006.01)
(52) U.S. Cl.
USPC ......... 358/1.13; 358/1.15; 358/474; 358/498; 463/17; 463/25; 235/380; 705/14.38
(58) Field of Classification Search
USPC ............ 358/1.13, 1.15, 474, 498; 463/17, 25; 235/380; 705/14.38
See application file for complete search history.

(56) References Cited

U.S. PATENT DOCUMENTS

| 6,350,005 | B1 * | 2/2002 | Asai et al. ........................ 347/19 |
| 2002/0109865 | A1 * | 8/2002 | Gatto et al. ..................... 358/471 |

(Continued)

FOREIGN PATENT DOCUMENTS

| CN | 1537726 A | 10/2004 |
| CN | 1604143 A | 4/2005 |

(Continued)

OTHER PUBLICATIONS

International Search Report for PCT/CN2010/072510, dated Dec. 2, 2010 (7 pgs.).

*Primary Examiner* — Jacky X Zheng
(74) *Attorney, Agent, or Firm* — Shumaker & Sieffert, P.A.

(57) ABSTRACT

A scanning-printing integrated apparatus is disclosed. The scanning-printing integrated apparatus comprises a first channel. The first channel comprises a scanning channel (11) which is provided with a scanning device (3) and a printing channel (12) which is provided with a first printing device (41). A paper input end of the scanning channel is communicated with a paper inlet (6) of the scanning-printing integrated apparatus, and a paper output end of the scanning channel is communicated with a paper input end of the printing channel. A paper output end of the printing channel is communicated with a first paper outlet (7) of the scanning-printing integrated apparatus. The scanning-printing integrated apparatus further comprises a paper accommodating device (5) and a second channel (21, 22) which is provided with a second printing device (4'1). A paper input end of the second channel is communicated with the paper accommodating device, and a paper output end of the second channel is communicated with a second paper outlet (7') of the scanning-printing integrated apparatus. The scanning-printing integrated apparatus has a function of scanning mark, a function of printing a mark on a scanned medium, a function of printing and a function of copying, so that it is convenient to be used, and the use cost is comparatively reduced.

13 Claims, 6 Drawing Sheets

(56) References Cited

U.S. PATENT DOCUMENTS

2004/0265032 A1* 12/2004 Furihata et al. ............... 400/693
2005/0127160 A1* 6/2005 Fujikawa ...................... 235/379
2006/0183554 A1* 8/2006 Piazzai et al. .................. 463/46

FOREIGN PATENT DOCUMENTS

| CN | 201114344 Y | 9/2008 |
| CN | 101662554 A | 3/2010 |
| WO | 2008078125 A1 | 7/2008 |

* cited by examiner

SCANNING-PRINTING INTEGRATED APPARATUS

FIELD OF THE INVENTION

The present invention relates to the scanning-printing technical field, in particular to a scanning-printing integrated apparatus.

BACKGROUND OF THE INVENTION

A scanning-printing integrated apparatus generally comprises two main parts: one is a scanning device and the other is a printing device. Depending on the structure, the scanning-printing integrated apparatus is generally classified into two types, wherein in a scanning-printing integrated apparatus of the first type, a scanning channel is not directly communicated with a printing channel, and a typical example is a copier; in a scanning-printing integrated apparatus of the second type, the scanning channel is communicated with the printing channel, and a typical example is an invalidated ticket treatment apparatus.

By taking a copier as an example, working process of the first type of scanning-printing integrated apparatus will be explained hereafter. During the operation of the copier, an original document is firstly input to a scanning channel to obtain original document information through a scanning device; then a printing medium is input to a printing channel to print the obtained original document information on the printing medium through a printing device.

By taking an invalidated ticket treatment apparatus as an example, working process of the second type of scanning-printing integrated apparatus will be explained hereafter. The invalidated ticket treatment apparatus is typically used in lottery ticket field, and can also be used in the other fields such as a traffic ticket, an entrance ticket, and even a currency, a valuable security and the like. During the operation of the invalidated ticket treatment apparatus for lottery ticket, a lottery ticket is firstly input to a scanning channel to obtain lottery ticket information through a scanning device, then the lottery ticket is controlled to enter a printing channel from the scanning channel, and lastly an invalid mark is printed on the lottery ticket by a printing device.

However, the above invalidated ticket treatment apparatus for lottery only has a function of scanning the lottery ticket and a function of printing a mark on the scanned lottery ticket, but does not have a function of printing lottery tickets. Therefore, at each lottery ticket selling station, both a dedicated printer and an invalidated ticket treatment apparatus are required wherein the dedicated printer is to print the lottery ticket purchased by a client, and the invalidated ticket treatment apparatus is to exchange the lottery ticket and print an invalid mark on the lottery ticket.

As seen from the above-mentioned working process of the invalidated ticket treatment apparatus, the scanning-printing integrated apparatus of the second type only has a function of scanning and a function of printing a mark on the scanned medium, but does not have a function of printing, therefore there is a need for a printing device additionally provided, so that the scanning-printing integrated apparatus of the second type is inconvenient to be used and the use cost is increased.

SUMMARY OF THE INVENTION

The present invention aims to solve the technical problem, i.e., how to provide a scanning-printing integrated apparatus which not only has a function of scanning and a function of printing a mark on a scanned medium, but also has a function of printing and a function of copying, so that the scanning-printing integrated apparatus according to the present invention is convenient to be used and the use cost is comparatively reduced.

In order to solve the above-mentioned technical problem, the present invention provides a scanning-printing integrated apparatus, which comprises a first channel, the first channel comprising a scanning channel which is provided with a scanning device and a printing channel which is provided with a first printing device, a paper input end of the scanning channel being communicated with a paper inlet of the scanning-printing integrated apparatus, and a paper output end of the scanning channel being communicated with a paper input end of the printing channel, and a paper output end of the printing channel being communicated with a first paper outlet of the scanning-printing integrated apparatus, the scanning-printing integrated apparatus further comprises a paper accommodating device and a second channel which is provided with a second printing device, a paper input end of the second channel being communicated with the paper accommodating device, and a paper output end of the second channel is communicated with a second paper outlet of the scanning-printing integrated apparatus.

Furthermore, the first paper outlet and the second paper outlet are the same paper outlet.

Furthermore, the first printing device and the second printing device are the same printing device; and the second channel further comprises a transition channel, through which the second printing device is communicated with the paper accommodating device.

Furthermore, the transition channel is provided with a delivery roll which can rotate in two directions to drive the printing medium in the paper accommodating device to enter or exit the printing channel.

Furthermore, the scanning-printing integrated apparatus comprises a first frame and a second frame, the first frame being pivoted with the second frame through a rotating shaft, the first frame having an opening position and a closing position with respect to the second frame, and the first channel and the first paper outlet are formed between the first frame and the second frame.

Furthermore, the second frame comprises a fixing frame and a movable frame which are pivoted with each other through the rotating shaft, and the paper accommodating device and the transition channel are arranged in a chamber defined by the fixing frame and the movable frame.

Furthermore, the scanning-printing integrated apparatus comprises a first frame and a second frame, the first frame being pivoted with the second frame through a rotating shaft, the first frame having an opening position and a closing position with respect to the second frame, and the first channel and the first paper outlet are formed between the first frame and the second frame.

Furthermore, the second frame comprises a fixing frame and a movable frame which are pivoted with each other through the rotating shaft, the paper accommodating device being arranged in a chamber defined by the fixing frame and the movable frame, and the second paper outlet being formed between the fixing frame and the movable frame.

Furthermore, the scanning device comprises two scanning modules which are respectively arranged at both sides of the scanning channel to perform double-face scanning on the medium to be scanned.

Furthermore, the first paper outlet is arranged on an upper wall or a lateral wall of the scanning-printing integrated apparatus.

Furthermore, a paper cutting device is arranged between the paper output end of second channel and the second paper outlet.

The scanning-printing integrated apparatus provided by the present invention comprises the first channel, the paper accommodating device and the second channel. The first channel comprises the scanning channel and the printing channel which is provided with the first printing device. The second channel is provided with the second printing device, the paper input end of the second channel is communicated with the paper accommodating device, and the paper output end thereof is communicated with the second paper outlet.

The advantages of the present invention will be detailed hereafter by taking the circumstance of applying the scanning-printing integrated apparatus in the lottery ticket field as an example.

When a lottery ticket needs to be printed, the successive type of printing medium stored in the paper accommodating device enters the second printing device through the second channel; the control device controls the second printing device to print images or characters possessed by the lottery ticket on the medium to be printed; then the lottery ticket is output from the second paper outlet.

When a lottery ticket needs to be exchanged, the lottery ticket is input to the scanning channel from the paper inlet; the information on the lottery ticket is obtained through scanning by the scanning device; and then the lottery ticket enters the printing channel. When a mark needs to be printed on the lottery ticket, the control device controls the first printing device to print the mark on the lottery ticket, and the lottery ticket on which the mark has been printed is output from the first paper outlet. When the lottery ticket does not need to be printed with a mark, the scanned lottery ticket is output from the first paper outlet through the printing channel.

In addition, the scanning-printing integrated apparatus provided by the present invention also has a function of copying. For example, when the medium to be scanned needs to be copied, firstly, the medium to be scanned enters the scanning channel through the paper inlet, the images or characters on the medium to be scanned is obtained by the scanning device and stored in the control device, and the scanned medium is output from first paper outlet of the first channel; and secondly, the control device drives the printing medium in the paper accommodating device to enter the second printing device of the second channel, the second printing device prints the images or characters obtained from the medium to be scanned on the printing medium.

As seen from above-mentioned examples, the scanning-printing integrated apparatus provided by the present invention not only has a function of scanning and a function of printing a mark on the scanned medium, but also has a function of printing and a function of copying, so that it is convenient to be used, and the use cost is comparatively reduced.

DETAILED DESCRIPTION OF THE EMBODIMENTS

The core of the present invention is to provide a scanning-printing integrated apparatus which not only has a function of scanning and a function of printing a mark on a scanned medium, but also has a function of printing and a function of copying, so that it is convenient to be used and the use cost is comparatively reduced.

In order to ensure those skilled in the art to better understand the technical solution of the present invention, the present invention will be further described in detail hereafter in connection with the drawings and specific embodiments.

Figure 1:
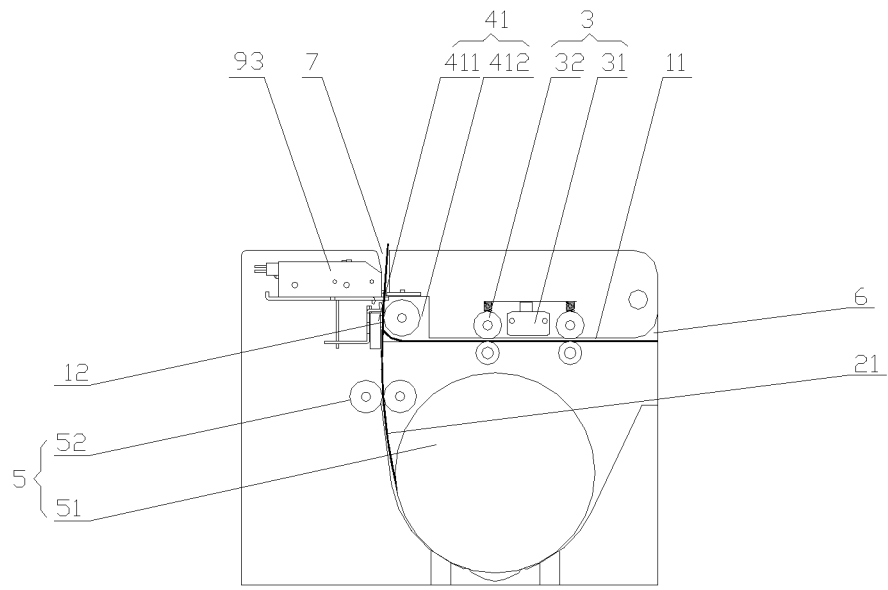
FIG. 1 is a structural schematic view of a scanning-printing integrated apparatus provided by a first embodiment of the present invention.

Referring to FIG. 1, FIG. 1 is a structural schematic view of a scanning-printing integrated apparatus provided by a first embodiment of the present invention.

In the first embodiment, the scanning-printing integrated apparatus is provided with a first channel. The first channel comprises a scanning channel 11 provided with a scanning device 3 and a printing channel 12 provided with a printing device. A paper input end of the scanning channel 11 is communicated with a paper inlet 6, and a paper output end of the scanning channel is communicated with a paper input end of the printing channel 12. A paper output end of the printing channel 12 is communicated with a paper outlet 7 located on the upper wall of the scanning-printing integrated apparatus. The scanning-printing integrated apparatus further comprises a second channel. A paper input end of the second channel is communicated with a paper accommodating device 5, and a paper output end of the second channel is communicated with the paper outlet 7. The second channel comprises a transition channel 21 and the printing channel 12, wherein the paper input end of the printing channel 12 is communicated with the paper accommodating device 5 through the transition channel 21. The first channel and the second channel meet at the paper input end of the printing channel 12 and share the same paper outlet 7.

The scanning device 3 comprises a scanning module 31 and at least one first feeding roll 32. The scanning module 31 may be a charge coupling image sensor CCD and is used to collect image information of the medium to be scanned. As a matter of course, the scanning module 31 can also be other types of scanning modules used to collect the image information of the medium to be scanned. The medium to be scanned (which may comprise a lottery ticket, a traffic ticket, an entrance ticket, a currency, a valuable security and the like, and which is generally paper-based medium, but not limited thereto) is input from the paper inlet 6, is delivered from the scanning channel 11 to the scanning module 31 under the drive of the first feeding rolls 32, and then is delivered to the printing device by the first feeding rolls 32 after image scanning is completed.

The printing device (a first printing device) comprises a printing module 41, which is arranged in the printing channel 12 and is used to print images or characters on the medium to be printed or on the scanned medium. The printing module 41 may be a thermal printing module, which comprises a thermal printing head 411 and a rubber roll 412. As a matter of course, the printing module 41 can also be other types of printing modules, such as laser printing module, dot matrix printing module or ink jet printing module and so on.

The paper output end of the scanning channel 11 is communicated with the paper input end of the printing channel 12. If it is required to print images or characters on the scanned medium, the printing module 41 will be controlled by a control device to execute printing, and then the medium is output from the paper outlet 7; and if it is not required to print images or characters on the scanned medium, the scanned medium will be output from the paper outlet 7 through the printing channel 12.

The paper accommodating device 5 comprises a paper house 51 and a second feeding roll 52. The paper house 51 is used for storing successive type of printing medium which may be in a winding drum shape or a folded shape. The shape of the paper house 51 is corresponding to the shape of the successive type of printing medium. The second feeding roll 52 is arranged in the transition channel 21 and is used to deliver the medium to be printed.

In order to avoid the first channel from being blocked by the printing medium in the paper accommodating device 5, the second feeding roll 52 can be further set so that it can perform rotation in forward direction and in backward direction. In this way, not only the printing medium in the paper accommodating device 5 can be driven to enter the printing channel 12 smoothly, but also the printing medium can be driven to exit the printing channel 12, with the result that the first channel is guaranteed to be unblocked and various requirements of the scanning or the printing can be met.

The transition channel 21 is communicated with the paper input end of the printing channel 12. The successive type of printing medium stored in the paper house 51 enters the printing channel 12 from the transition channel 21 under the drive of the second feeding roll 52. When the medium to be printed passes through the printing module 41, the printing module 41 is controlled by the control device to print images or characters on the medium to be printed. As seen from FIG. 1, in the present embodiment, the printing device used in the second channel (a second printing device) and the printing device used in the first channel (the first printing device) are the same printing device. In this way, the structure is simplified and the cost is reduced.

In addition, the scanning-printing integrated apparatus also has a function of copying. For example, when the medium to be scanned needs to be copied, firstly the medium to be scanned enters the scanning channel 11 through the paper inlet, the images or characters on the medium to be scanned are obtained by the scanning device and stored in the control device, the scanned medium is output from the paper outlet of the first channel; and secondly, the control device drives the second feeding roll 52 to bring the printing medium in the paper accommodating device 5 into the printing device of the second channel, the printing device prints on the printing medium the images or characters obtained from the medium to be scanned.

Therefore, the scanning-printing integrated apparatus not only has a function of scanning and a function of printing a mark on the scanned medium, but also has a function of printing and a function of copying, so that it is convenient to be used and the use cost is comparatively reduced.

The scanning-printing integrated apparatuses provided by a second, a third and a fourth embodiments which will be described hereafter have substantially the same technical effects with the scanning-printing integrated apparatus provided by the first embodiment, so that unnecessary details will not be given anymore.

Figure 4:
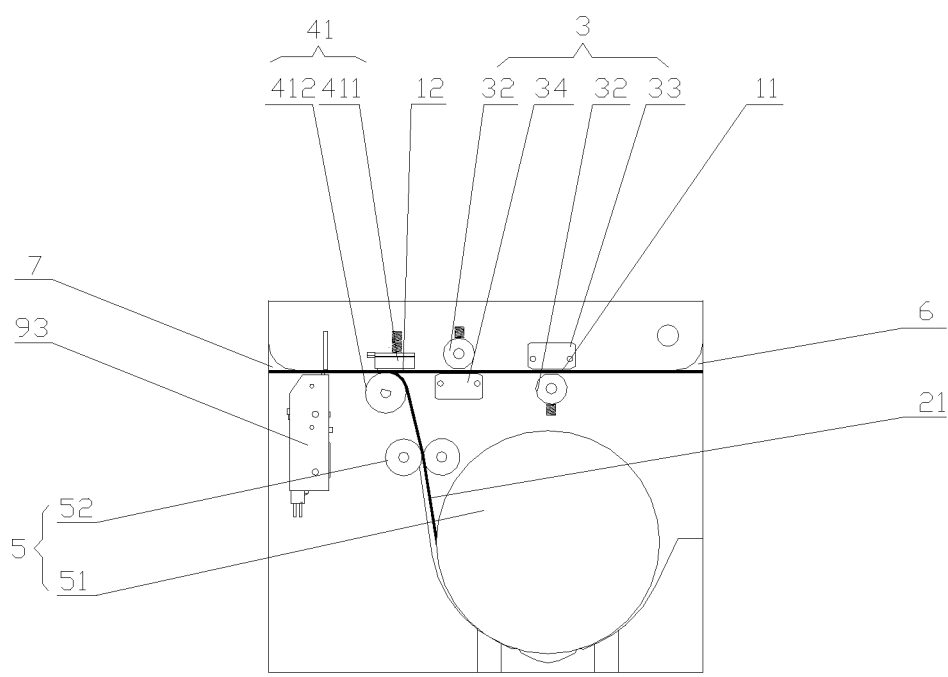
FIG. 4 is a structural schematic view of a scanning-printing integrated apparatus provided by a second embodiment of the present invention.

Referring to FIG. 4, FIG. 4 is a structural schematic view of a scanning-printing integrated apparatus provided by a second embodiment of the present invention.

In the second embodiment, the scanning-printing integrated apparatus has substantially the same structure with the scanning-printing integrated apparatus mentioned in the first embodiment. The differences are as following: the paper outlet 7 in the first embodiment is arranged on the upper wall of the scanning-printing integrated apparatus; and the paper outlet 7 in the second embodiment is arranged on the lateral wall of the scanning-printing integrated apparatus.

In the second embodiment, the scanning-printing integrated apparatus has substantially the same working process with the scanning-printing integrated apparatus mentioned in the first embodiment. The differences are as following: the scanning device 3 of the second embodiment comprises two scanning modules and can realize double-face scanning.

Specifically, the scanning device 3 comprises a first scanning module 33, a second scanning module 34 and two first feeding rolls 32. The two first feeding rolls 32 are opposite to and closely contact with the first scanning module 33 and the second scanning module 34, respectively. Both the first scanning module 33 and the second scanning module 34 are contact type image sensors CIS and are used to collect the image information on front and back faces of the medium to be scanned, respectively. As a matter of course, the first scanning module 33 and the second scanning module 34 can also be other types of scanning modules which can collect the image information on front and back faces of the medium to be scanned. The medium to be scanned is input from the paper inlet 6, is delivered from the scanning channel 11 under the drive of the first feeding rolls 32, and passes through the first scanning module 33 and the second scanning module 34 sequentially. The image information on front and back faces of the medium to be scanned is collected respectively by the two scanning modules. After the image scanning is completed, the medium is delivered to the printing device by the first feeding rolls 32.

As a matter of course, in the above-mentioned first embodiment, the scanning device in the second embodiment can be used as the scanning device 3. Specifically, the scanning device 3 can comprise the first scanning module 33, the second scanning module 34 and the two first feeding rolls 32. The two first feeding rolls 32 are opposite to and closely contact with the first scanning module 33 and the second scanning module 34, respectively. Both the first scanning module 33 and the second scanning module 34 are contact type image sensors CIS and are used to collect the image information on front and back faces of the medium to be scanned, respectively. As a matter of course, the first scanning module 33 and the second scanning module 34 can also be other types of scanning modules which can collect the image information on front and back faces of the medium to be scanned.

In a similar way, in the above-mentioned second embodiment, the scanning device in the first embodiment can be used as the scanning device 3. The scanning device 3 can comprise the scanning module 31 and at least one first feeding roll 32. The scanning module 31 is a charge coupling image sensor CCD and is used to collect the image information of the medium to be scanned.

Figure 2:
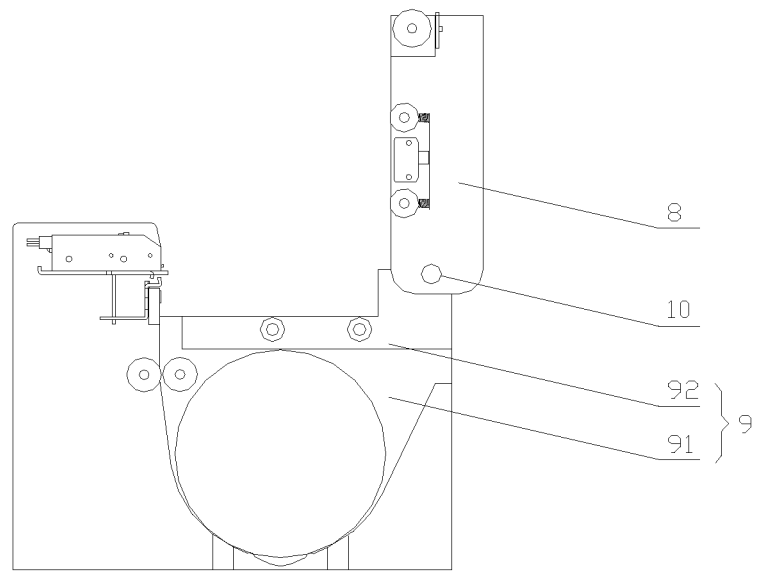
FIG. 2 is a structural schematic view of the scanning-printing integrated apparatus provided by the first embodiment of the present invention when a first frame is in an opening state.
Figure 5:
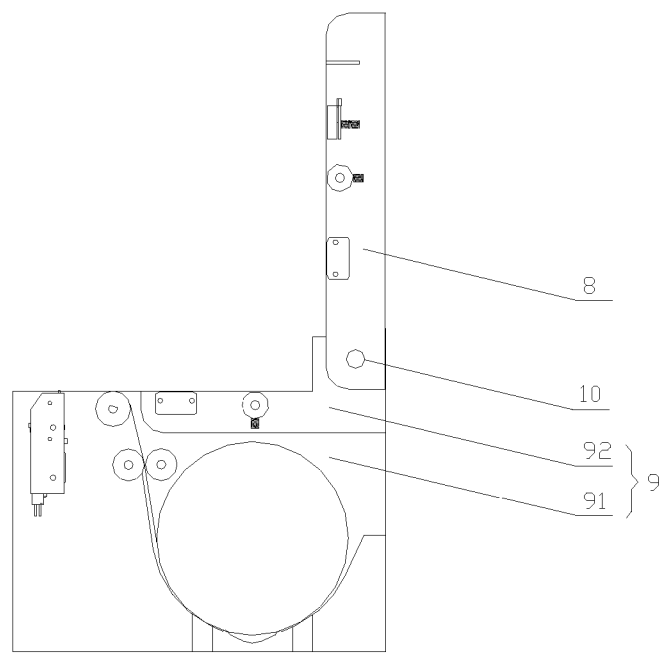
FIG. 5 is a structural schematic view of the scanning-printing integrated apparatus provided by the second embodiment of the present invention when a first frame is in an opening state.

Referring to FIGS. 2 and 5, FIG. 2 is a structural schematic view of the scanning-printing integrated apparatus provided by the first embodiment of the present invention when a first frame is in the opening state, and FIG. 5 is a structural schematic view of the scanning-printing integrated apparatus provided by the second embodiment of the present invention when a first frame is in the opening state.

In the first and second embodiments, the scanning-printing integrated apparatus may further comprise a first frame 8 and a second frame 9. The first channel which comprises the scanning channel 11 and the printing channel 12, and the paper outlet 7 are formed between the first frame 8 and the second frame 9. The first frame 8 is pivoted with the second frame 9 through a rotating shaft 10. When a paper jam failure needs to be dealt with, or when the scanning module 31, the scanning module 33, the scanning module 34 or the printing module 41 needs to be cleaned and maintained, the first frame 8 rotates around the rotating shaft 10 to separate from the second frame 9, so that the paper jam failure can be dealt with or the above-mentioned modules can be cleaned and maintained. After the maintenance is completed, the first frame 8 rotates again around the rotating shaft 10 to engage with the second frame 9, so that the dealing operation of the paper jam failure or the cleaning and maintenance work of the above-mentioned modules becomes convenient and easy to be done.

Figure 3:
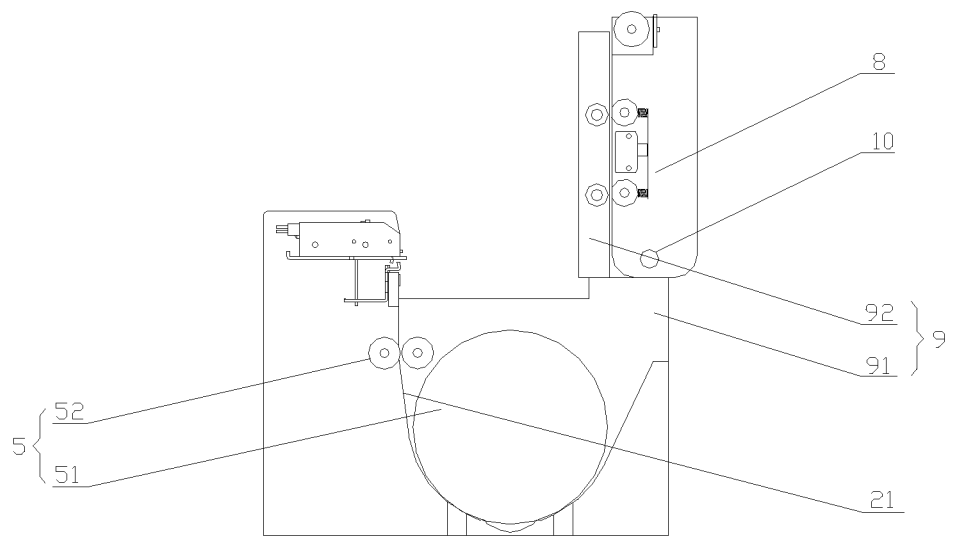
FIG. 3 is a structural schematic view of the scanning-printing integrated apparatus provided by the first embodiment of the present invention when a movable frame is in the opening state.
Figure 6:
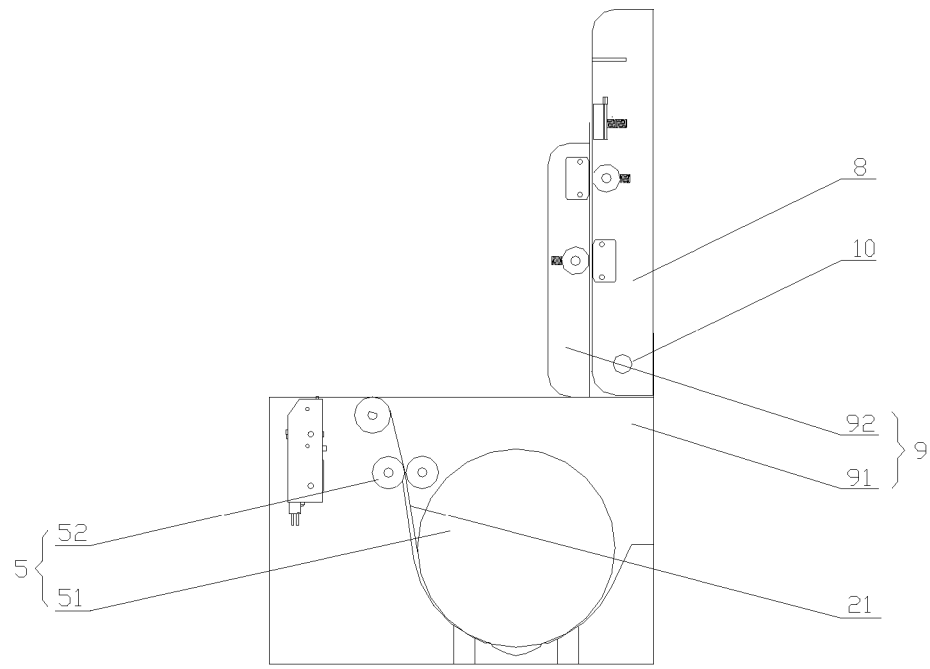
FIG. 6 is a structural schematic view of the scanning-printing integrated apparatus provided by the second embodiment of the present invention when a movable frame is in the opening state.

Referring to FIGS. 3 and 6, FIG. 3 is a structural schematic view of the scanning-printing integrated apparatus provided by the first embodiment of the present invention when a movable frame is in the opening state; and FIG. 6 is a structural schematic view of the scanning-printing integrated apparatus provided by the second embodiment of the present invention when the movable frame is in the opening state.

In the first and second embodiments, the second frame 9 can further comprise a fixing frame 91 and a movable frame 92 which are pivoted with each other through the rotating shaft 10. The paper accommodating device 5 and the transition channel 21 are arranged in a chamber defined by the fixing frame 91 and the movable frame 92. The paper house 51 of the paper accommodating device 5 is arranged in the chamber defined by the fixing frame 91 and the movable frame 92. When it is required to replace the successive type of medium, the first frame 8 and the movable frame 92 can be made to simultaneously rotate around the rotating shaft 10 to separate from the fixing frame 91, so that the fixing frame 91 is open and the successive type of printing medium in the paper house 51 is replaced. The operation is simple, convenient and easy.

Figure 7:
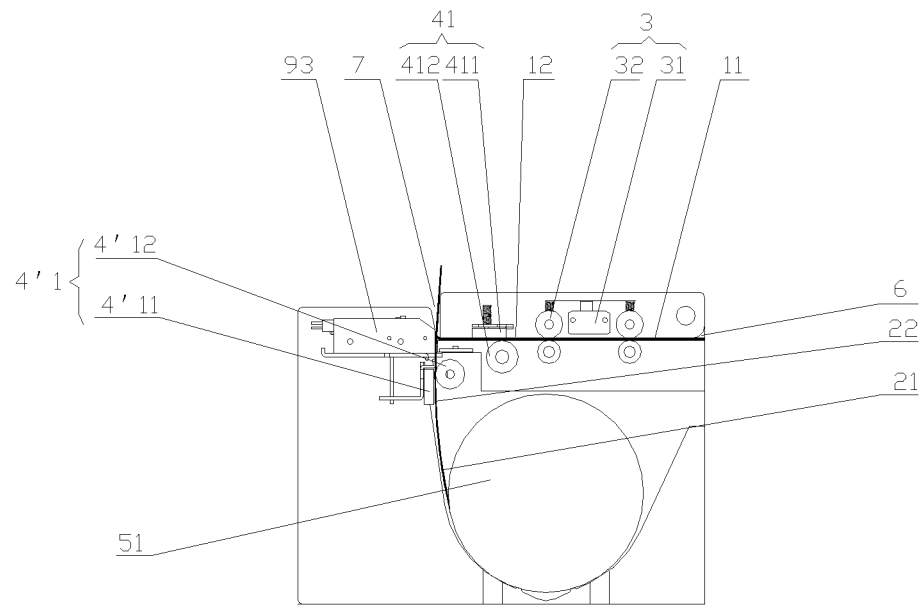
FIG. 7 is a structural schematic view of a scanning-printing integrated apparatus provided by a third embodiment of the present invention.

Referring to FIG. 7, FIG. 7 is a structural schematic view of a scanning-printing integrated apparatus provided by a third embodiment of the present invention.

Compared with the structure of the scanning-printing integrated apparatus in the first embodiment, the structure of the scanning-printing integrated apparatus in the third embodiment is different as following: the scanning-printing integrated apparatus further comprises a second channel which is independent of the first channel. The second channel comprises a transition channel 21 and a printing channel 22 which is provided with a printing device. The paper input end of the printing channel 22 is communicated with the paper accommodating device 5 through the transition channel 21. The transition channel 21 may also be omitted in this embodiment, and a second feeding roll 52 is also unnecessary to be arranged. That is to say, the paper input end of the printing channel 22 can be directly communicated with the paper accommodating device 5.

The paper outlet 7 in the first embodiment is arranged on the upper wall of the scanning-printing integrated apparatus; and the paper outlet 7 in the third embodiment can be arranged on the upper wall of the scanning-printing integrated apparatus or on the lateral wall of the scanning-printing integrated apparatus.

In the third embodiment, the scanning-printing integrated apparatus has substantially the same working process with the scanning-printing integrated apparatus mentioned in the first embodiment. The differences are as following: in the first embodiment, the first channel and the second channel share one printing device; and in the third embodiment, another printing device is arranged in the printing channel 22 of the second channel, and the function of printing of the scanning-printing integrated apparatus is realized by the printing device.

Specifically, the printing device (a second printing device) in the printing channel 22 comprises a printing module 4'1 which is used to print images or characters on the medium to be printed. The printing module 4'1 is a thermal printing module which comprises a thermal printing head 4'11 and a rubber roll 4'12. As a matter of course, the printing module 4'1 can also be other types of printing modules, such as laser printing module, dot matrix printing module or ink jet printing module and so on. The transition channel 21 is communicated with the paper input end of the printing channel 22. The successive type of printing medium stored in the paper house 51 enters the printing channel 22 from the transition channel 21 under the drive of the second feeding roll 52 (not shown in the figure). When the medium to be printed passes through the printing module 4'1, the control device controls the printing module 4'1 to print the images or characters on the medium to be printed, and the medium is output from the paper outlet 7.

Figure 10:
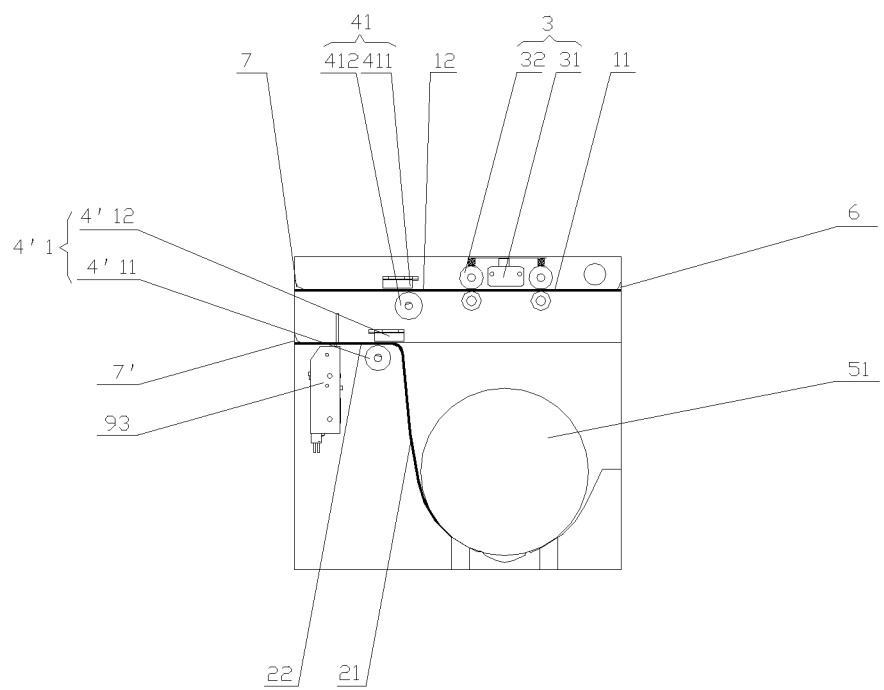
FIG. 10 is a structural schematic view of a scanning-printing integrated apparatus provided by a fourth embodiment of the present invention.

Referring to FIG. 10, FIG. 10 is a structural schematic view of a scanning-printing integrated apparatus provided by a fourth embodiment of the present invention.

Compared with the third embodiment, the scanning-printing integrated apparatus in the fourth embodiment has substantially the same structure. The differences are as following: the first channel and the second channel are respectively communicated with different paper outlets; the first channel is communicated with the paper outlet 7, and the second channel is communicated with the paper outlet 7'; the paper outlet 7 and the paper outlet 7' in this embodiment are arranged on the same lateral wall of the scanning-printing integrated apparatus. As a matter of course, in other embodiments, the paper outlet 7 and the paper outlet 7' may both be arranged on the upper wall of the scanning-printing integrated apparatus, or one is arranged on the upper wall and the other one is arranged on the lateral wall.

In the fourth embodiment, the scanning-printing integrated apparatus has substantially the same working process with the scanning-printing integrated apparatus mentioned in the third embodiment. The differences are as following: in the third embodiment, the scanned medium, the medium which has been scanned and printed with marks, or the printed medium is all output from the paper outlet 7; while in the fourth embodiment, the scanned medium and the medium which has been scanned and printed with marks are output from the paper outlet 7, and the printed medium is output from the paper outlet 7'.

Figure 8:
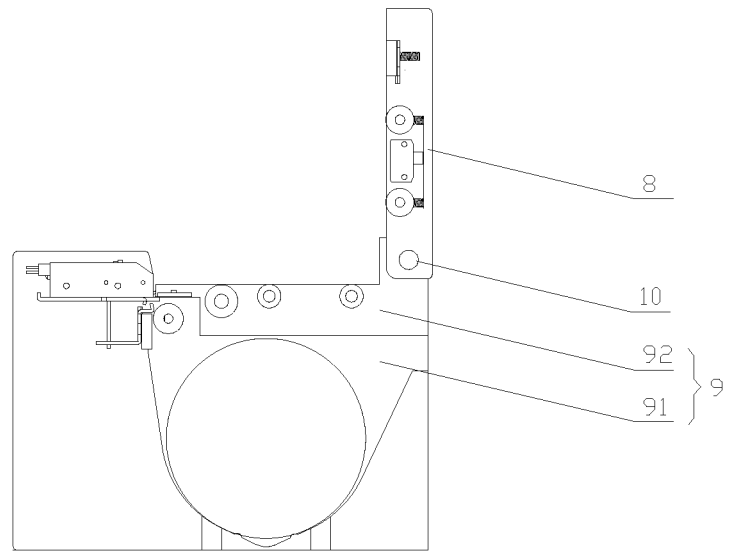
FIG. 8 is a structural schematic view of the scanning-printing integrated apparatus provided by the third embodiment of the present invention when a first frame is in an opening state.
Figure 11:
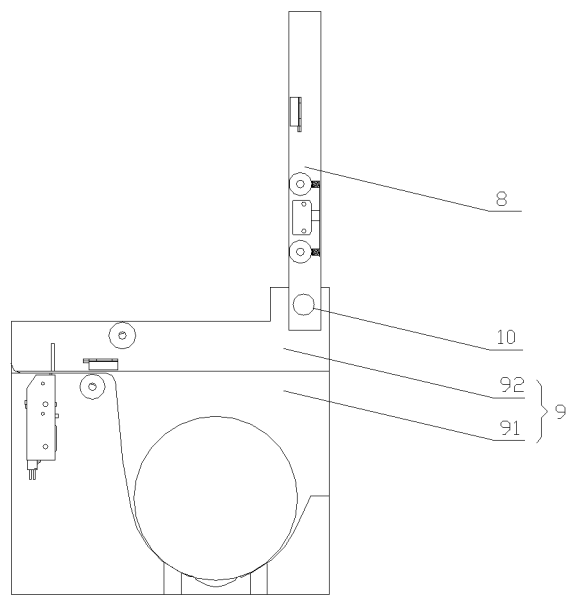
FIG. 11 is a structural schematic view of the scanning-printing integrated apparatus provided by the fourth embodiment of the present invention when a first frame is in an opening state.

Referring to FIGS. 8 and 11, FIG. 8 is a structural schematic view of the scanning-printing integrated apparatus provided by the third embodiment of the present invention when the first frame is in the opening state; and FIG. 11 is a structural schematic view of the scanning-printing integrated apparatus provided by the fourth embodiment of the present invention when the first frame is in the opening state.

In the third and fourth embodiments, the scanning-printing integrated apparatus can further comprise a frame 8 and a second frame 9. The first channel which comprises the scanning channel 11 and the printing channel 12 is formed between the first frame 8 and the second frame 9. The first frame 8 is pivoted with the second frame 9 through a rotating shaft 10. When a paper jam failure needs to be dealt with, or when the scanning module 31, the scanning module 33, the scanning module 34 or the printing module 41 needs to be cleaned and maintained, the first frame 8 rotates around the rotating shaft 10 to separate from the second frame 9, so that the paper jam failure can be dealt with or the above-mentioned modules can be cleaned and maintained. After the maintenance is completed, the first frame 8 is made to rotate again around the rotating shaft 10 to engage with the second frame 9, so that the dealing operation of the paper jam failure or the cleaning and maintenance work of the above-mentioned modules becomes convenient and easy to be done.

Figure 9:
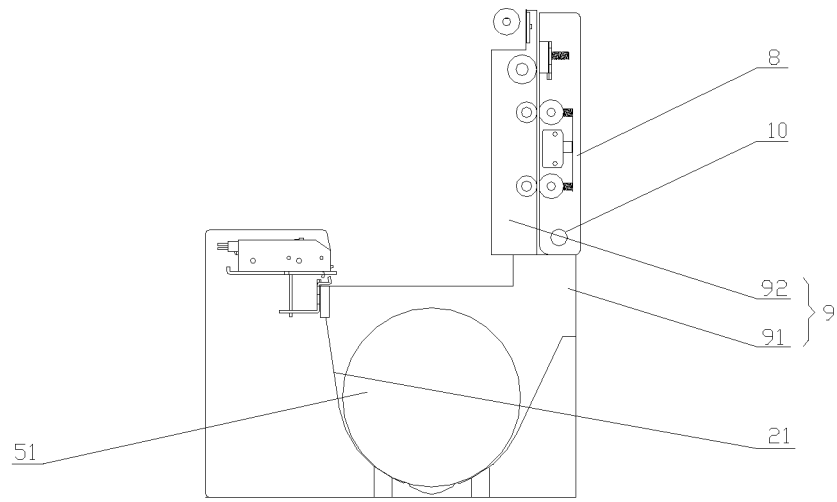
FIG. 9 is a structural schematic view of the scanning-printing integrated apparatus provided by the third embodiment of the present invention when a movable frame is in the opening state.
Figure 12:
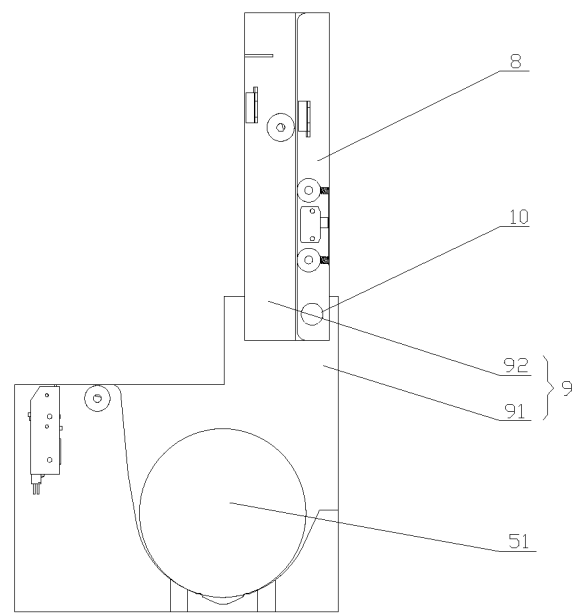
FIG. 12 is a structural schematic view of the scanning-printing integrated apparatus provided by the fourth embodiment of the present invention when a movable frame is in the opening state.

Referring to FIGS. 9 and 12, FIG. 9 is a structural schematic view of the scanning-printing integrated apparatus provided by the third embodiment of the present invention when a movable frame is in the opening state; and FIG. 12 is a structural schematic view of the scanning-printing integrated apparatus provided by the fourth embodiment of the present invention when the movable frame is in the opening state.

In the third and fourth embodiments, the second frame 9 can further comprise a fixing frame 91 and a movable frame 92 which are pivoted with each other through the rotating shaft 10. The paper accommodating device 5 and the transition channel 21 are arranged in a chamber defined by the fixing frame 91 and the movable frame 92. The printing channel 22 of the second channel is formed between the fixing frame 91 and the movable frame 92. The paper house 51 of the paper accommodating device 5 is arranged in the chamber defined by the fixing frame 91 and the movable frame 92. When it is required to replace the successive type of medium, the first frame 8 and the movable frame 92 can be made to simultaneously rotate around the rotating shaft 10 to separate from the fixing frame 91, so that the fixing frame 91 is open and the successive type of printing medium in the paper house 51 is replaced. The operation is simple, convenient and easy.

In the third embodiment, the paper outlet 7 shared by the first channel and the second channel is formed between the first frame 8 and the second frame 9. In the fourth embodiment, the paper outlet 7 (the first paper outlet) is formed between the first frame 8 and the second frame 9, and the paper outlet 7' (the second paper outlet) is formed between the fixing frame 91 and the movable frame 92.

Referring to FIGS. 1, 4, 7 and 10, in the above four embodiments, the paper outlet communicated with the paper output end of the second channel (the paper outlet 7 in FIGS. 1, 4 and 7; the paper outlet 7' in FIG. 10) can be further provided with a paper cutting device 93. The paper cutting device 93 may be an automatic paper cutting device, and may also be a manual paper cutting device. After the printing is completed, the control device controls the paper cutting device 93 to cut off the printed medium, which may be taken away conveniently by a user.

A detailed description of the scanning-printing integrated apparatus provided in the present invention is given above. Specific embodiments are used herein to explain the principle and implementation mode of the present invention. The explanation of the embodiments mentioned above is only used for helping understand the method and core idea of the present invention. It should be pointed out that any relevant improvements and modifications to the present invention made by those skilled in the art are all included in the protection scope of the claims of the present invention, without deviating from the principle of the present invention.

What is claimed is:

1. A scanning-printing integrated apparatus, which comprises a first channel, the first channel comprising a scanning channel which is provided with a scanning device and a printing channel which is provided with a first printing device, a paper input end of the scanning channel being communicated with a paper inlet of the scanning-printing integrated apparatus, and a paper output end of the scanning channel being communicated with a paper input end of the printing channel, and a paper output end of the printing channel being communicated with a first paper outlet of the scanning-printing integrated apparatus, the scanning-printing integrated apparatus further comprises a paper accommodating device and a second channel which is provided with a second printing device, a paper input end of the second channel being communicated with the paper accommodating device, and a paper output end of the second channel being communicated with a second paper outlet of the scanning-printing integrated apparatus;

wherein:
the first paper outlet and the second paper outlet are the same paper outlet,
the first printing device and the second printing device are the same printing device, and
the second channel further comprises a transition channel, through which the second printing device is communicated with the paper accommodating device.

2. The scanning-printing integrated apparatus according to claim 1, wherein the transition channel is provided with a delivery roll which can rotate in two directions to drive the printing medium in the paper accommodating device to enter or exit the printing channel.

3. The scanning-printing integrated apparatus according to claim 2, wherein the scanning-printing integrated apparatus comprises a first frame and a second frame, the first frame being pivoted with the second frame through a rotating shaft, the first frame having an opening position and a closing position with respect to the second frame, and the first channel and the first paper outlet are formed between the first frame and the second frame.

4. The scanning-printing integrated apparatus according to claim 3, wherein the second frame comprises a fixing frame and a movable frame which are pivoted with each other through the rotating shaft, and the paper accommodating device and the transition channel are arranged in a chamber defined by the fixing frame and the movable frame.

5. The scanning-printing integrated apparatus according to claim 1, wherein the scanning-printing integrated apparatus comprises a first frame and a second frame, the first frame being pivoted with the second frame through a rotating shaft, the first frame having an opening position and a closing position with respect to the second frame, and the first channel and the first paper outlet are formed between the first frame and the second frame.

6. The scanning-printing integrated apparatus according to claim 5, wherein the second frame comprises a fixing frame and a movable frame which are pivoted with each other through the rotating shaft, and the paper accommodating device and the transition channel are arranged in a chamber defined by the fixing frame and the movable frame.

7. The scanning-printing integrated apparatus according to claim 6, wherein the first paper outlet is arranged on an upper wall or a lateral wall of the scanning-printing integrated apparatus.

8. The scanning-printing integrated apparatus according to claim 1, wherein the scanning-printing integrated apparatus comprises a first frame and a second frame, the first frame being pivoted with the second frame through a rotating shaft, the first frame having an opening position and a closing position with respect to the second frame, and the first channel and the first paper outlet are formed between the first frame and the second frame.

9. The scanning-printing integrated apparatus according to claim 8, wherein the second frame comprises a fixing frame and a movable frame which are pivoted with each other through the rotating shaft, the paper accommodating device being arranged in a chamber defined by the fixing frame and the movable frame, and the second paper outlet being formed between the fixing frame and the movable frame.

10. The scanning-printing integrated apparatus according to claim 1, wherein the scanning device comprises two scanning modules which are respectively arranged at both sides of the scanning channel to perform double-face scanning on the medium to be scanned.

11. The scanning-printing integrated apparatus according to claim 1, wherein a paper cutting device is arranged between the paper output end of second channel and the second paper outlet.

12. The scanning-printing integrated apparatus according to claim 1, wherein the scanning-printing integrated apparatus comprises a first frame and a second frame, the first frame being pivoted with the second frame through a rotating shaft, the first frame having an opening position and a closing position with respect to the second frame, and the first channel and the first paper outlet are formed between the first frame and the second frame.

13. The scanning-printing integrated apparatus according to claim 12, wherein the second frame comprises a fixing frame and a movable frame which are pivoted with each other through the rotating shaft, and the paper accommodating device and the transition channel are arranged in a chamber defined by the fixing frame and the movable frame.

* * * * *